Figure 1:
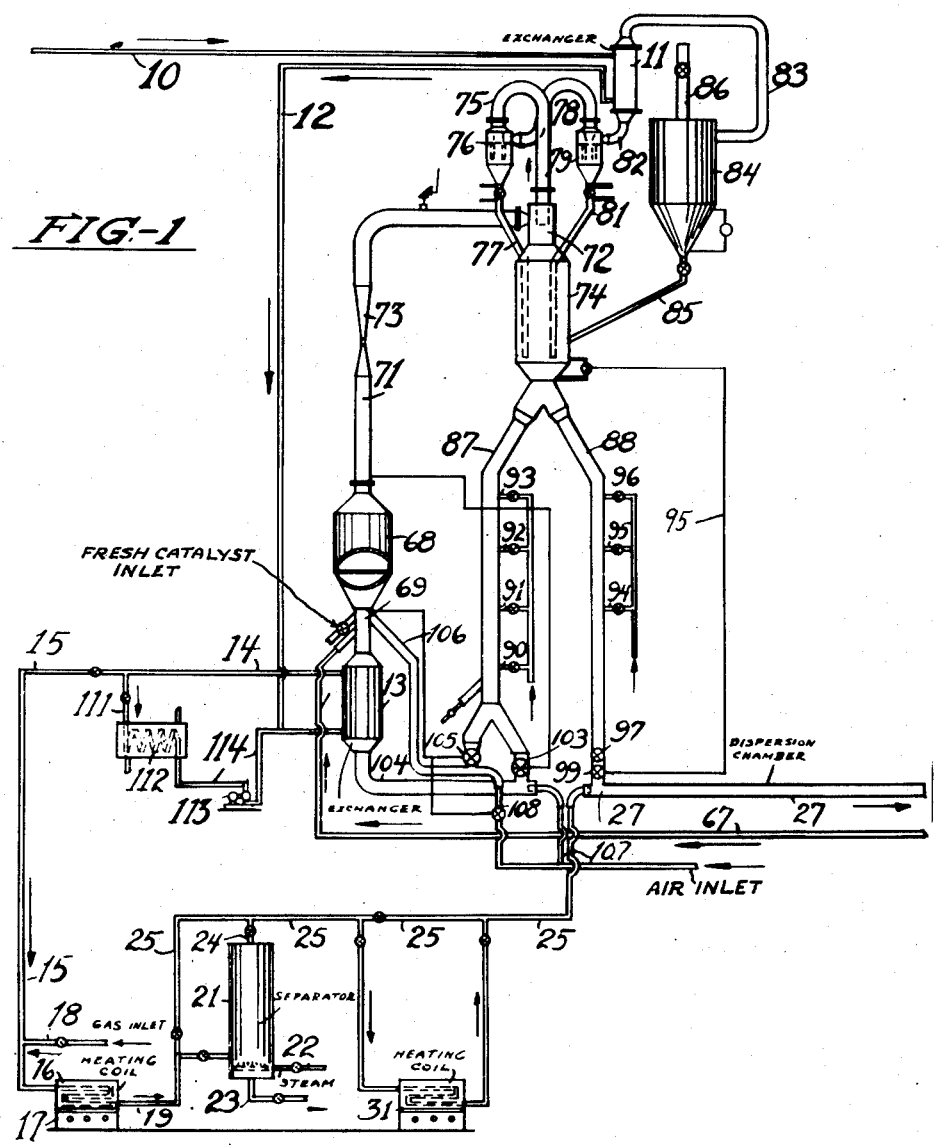

Oct. 19, 1948.　　D. L. CAMPBELL ET AL　　2,451,804
METHOD OF AND APPARATUS FOR
CONTACTING SOLIDS AND GASES
Filed Dec. 27, 1940　　2 Sheets-Sheet 2

Patented Oct. 19, 1948

2,451,804

UNITED STATES PATENT OFFICE 2,451,804

METHOD OF AND APPARATUS FOR CONTACTING SOLIDS AND GASES

Donald L. Campbell, Short Hills, Homer Z. Martin, Elizabeth, and Eger V. Murphree and Charles W. Tyson, Summit, N. J., assignors to Standard Oil Development Company, a corporation of Delaware Application December 27, 1940, Serial No. 371,923

23 Claims. (Cl. 196—52)

This invention relates to a method of and apparatus for contacting solid material in finely-divided form with gaseous products and pertains more particularly to a process and apparatus in which solid material in finely-divided form is intermingled in a gaseous medium and the resulting mixture passed through a treating zone.

The invention finds application in industrial processes of various types wherein finely-divided solids are intermixed with a gaseous or vaporous stream in a continuous manner for the purpose of bringing about physical or chemical changes in the gases or solids, or both.

As examples of processes wherein solids are acted upon by gases in which some phases of the invention may be adapted are: the low temperature carbonization of coal, production of water gas from coal, distillation of wood, oil shale, or coal, treatment of ores, such as reduction and roasting of various metallic ores, drying of solids, and the like.

As examples of non-catalytic processes wherein gases are acted upon by the solids and in which certain phases of the invention find application are: oxidation of gases by various solid oxides, separation and purification of gases by solid adsorbents, such as activated carbon and oxide gels as in air conditioning, recovery of vapors from gases, as in the recovery of solvents from gases in dry cleaning and painting establishments, recovery of gasoline constituents from natural gas, casinghead gas or cracked refinery gas, and the like, separation of gases or vapors by selective adsorption as in selective removal of higher boiling hydrocarbons from lower boiling hydrocarbons.

A third class of processes in which the invention finds application is that in which the finely-divided solid acts as a catalyst for bringing about gas reactions. As examples may be mentioned various organic reactions involving oxidation, reduction, chlorination, hydration, dehydration, and the like, and more particularly various hydrocarbon reactions wherein solid catalysts or treating agents may be employed, such as in cracking, hydrogenation, dehydrogenation, polymerization, alkylation, dealkylation, isomerization, aromatization, desulfurization, synthesis of hydrocarbons from carbon monoxide and hydrogen, and the like.

The invention in its more specific phases is especially directed to processes in which the solid material after passing through the treating zone is separated from the gaseous or vaporous stream and again returned to the treating zone. In particular, it has application to processes in which it is desirable to (1) reactivate or regenerate catalyst powders before returning the same to the treating zone, as in the catalytic conversion of hydrocarbon oils or vapors, or (2) rapidly add or extract heat from the treating zone in which strong exothermic or endothermic reactions are carried out.

The present invention has for its general object the provision for a method of and apparatus for contacting solids with gases, involving mixing finely-divided solids in a gaseous stream and carrying the resulting mixture through a treating zone in a continuous manner which is more simple and economical to construct and operate and which will not be subject to the operating difficulties heretofore experienced in processes of this general nature.

Other more specific objects and advantages of the invention will be made apparent from the more detailed description hereinafter.

The invention in its entirety comprehends a complete unitary process involving reaction and regenerative treatment of the powdered material in a closed circuit and also embraces certain combinations and sub-combinations of process and elements as set forth in the claims hereinafter.

For illustrative purposes the invention will be described with specific reference to the catalytic cracking of petroleum oils in which it has been found to be particularly applicable, it being understood from the above disclosure that the invention in its broader phases will have a more general application.

Figure 1A:
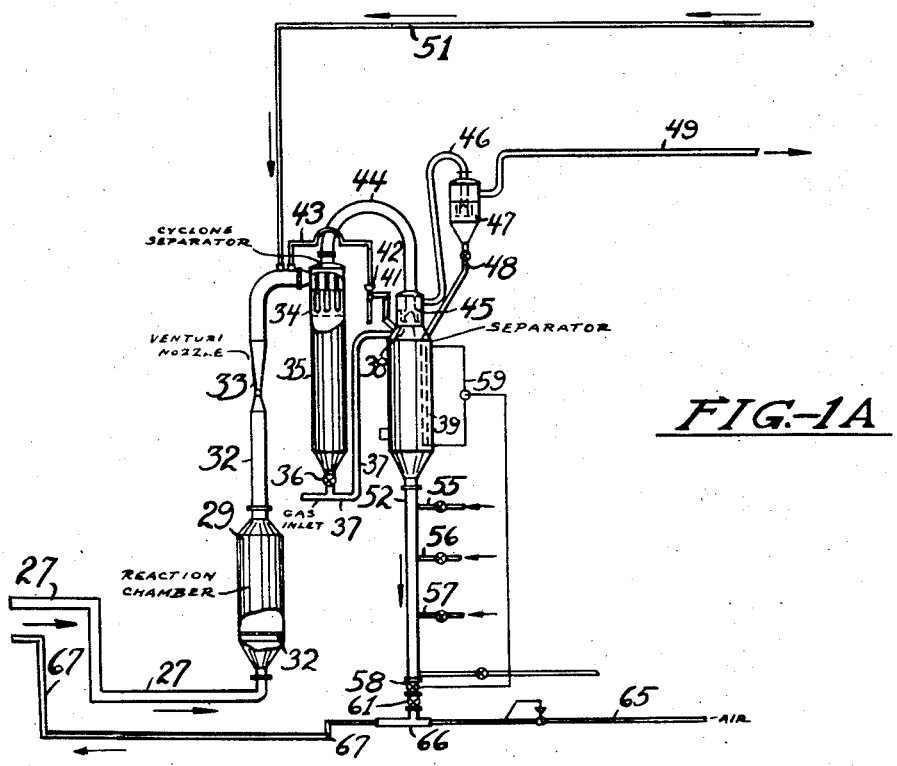

For a fuller understanding of the invention, reference will now be made to the accompanying drawing, wherein:

Fig. 1 is a diagrammatic view in elevation of a part of the apparatus forming a part of the present invention, and Fig. 1A is a continuation of Fig. 1 showing the remainder of the apparatus.

Referring to Fig. 1 of the drawing, reference character 10 designates a charge line through which the oil to be cracked is introduced into the system. This oil may be a clean condensate stock such as a gas oil or it may be a residual stock such as topped or reduced crude.

The oil introduced into the system through line 10 is first passed through a heat exchanger 11 wherein the oil passes in heat exchange relation with spent regenerating gases as hereinafter described. The oil from heat exchanger 11 passes through line 12 to a second heat exchanger 13 where it is further heated by heat exchange with powdered catalytic material withdrawn from the regenerating zone later described. The oil, after passing through heat exchanger 13, is transferred through lines 14 and 15 to a vaporizing coil 16 located in furnace 17 where it is rapidly heated to a temperature sufficient to vaporize at least a substantial portion of the oil. If desired, steam or other stripping gas may be introduced into the oil through line 18 prior to or during passage through the vaporizing coil 16 to assist in the vaporization of the oil.

Products from the vaporizing coil 16 may pass through transfer line 19 to a separator 21 for separating vapors from unvaporized residue. Additional steam or other stripping agent may be introduced into the separator 21 through line 22. Unvaporized residue segregated in the separator 21 may be removed therefrom through line 23. Vapors liberated in the separator 21 pass overhead through line 24.

In cases where the oil to be treated is a clean condensate stock, the separator 21 may be omitted or the oil from the vaporizing coil 16 may by-pass the separator 21 through line 25.

The vapors liberated in the separator 21 constitute the charging stock to the catalytic cracking unit. These vapors may be passed through lines 24 and 25 to a conduit 27 wherein the vapors intermix with powdered catalytic material introduced into the conduit as later described. The resulting dispersion of oil vapors and powdered material passes through the conduit 27 to a cracking vessel 29. (See Fig. 1A.)

In some cases it is desirable to further heat the oil vapors from the separator 21. In such case vapors from line 24 may be passed through a superheating coil 31 or other heating device for imparting the desired heat to the vapors.

The amount of catalyst introduced into the oil vapors passing to the reaction chamber 29 may vary over an extended range depending upon a number of factors, such as the characteristics of the oil to be cracked, the activity of the catalyst, and the amount of conversion desired. In general, the amount of catalyst so introduced may be between the limits of from .5 to 20 parts of catalyst per part of oil by weight.

The bottom section of the reaction chamber may be provided with a perforated plate 32 through which the dispersion passes. The purpose of the plate is to distribute the dispersion uniformly through the full cross-sectional area of the cracking vessel.

The cracking vessel is preferably made of such dimensions that the desired conversion is obtained at relatively low velocities, such as from .5 to 10 feet per second. Because of the relatively low velocities at which the gases flow through the circuit, the powder tends to settle out of the gas. As a result there is a considerable slippage between the solid particles and the vapors so that continuous intermixing of the gas and solids is attained. Furthermore, the density of the suspension or dispersion within the reaction zone will be materially greater than the density of the stream passing to the reaction zone or the relative proportions of catalyst and oil vapors introduced into the zone. The density of the mixture within the zone should be at least twice that of the stream passing thereto. Expressed in other words, the velocity of the gases passing through the reactor is preferably controlled with respect to the size and density of the catalyst particles so that the time of residence of the catalyst particles within the cracking zone in such case is materially greater than the time of residence of the oil vapors. For example, whereas the time of residence of the oil vapors may be of the order of from 5 to 50 seconds, the time of residence of the solid particles within the cracking zone may be of the order of from 10 seconds to an hour or more. As a result, a smaller and more compact reactor may be used for a cracking unit of given capacity and the amount of powdered catalyst in circulation may also be reduced.

The velocity of the oil vapors passing through the cracking zone, however, is preferably sufficient to prevent complete settling of the powder so that the cracked vapors may be utilized for removing the powdered material from the cracking zone.

The suspension of oil vapors and catalyst, after passing through the cracking vessel, is removed therefrom through line 32 having a Venturi nozzle 33 and is passed to a primary cyclone separator 34 wherein the bulk of the powder is removed from the oil vapors. The catalyst separated in the primary cyclone separator 34 is discharged into the bottom section 35 which is preferably of sufficient size to provide a reserve supply sufficient to last from 5 to 15 minutes. The catalyst discharges from hopper 35 through a suitable valve 36 into a stream of stripping gas such as steam passing through line 37 to a cyclone separator 38 forming the upper section of a second catalyst hopper 39. The steam separated in the separator 38 is withdrawn therefrom through line 41 and is passed by means of steam injector 42 to the inlet side of the primary cyclone separator 34 through line 43.

The reintroduction of the catalyst into a stream of steam in line 37 is primarily for the purpose of removing any volatile oil constituents which may be retained within the catalyst after the separation. In lieu of steam other inert gas such as nitrogen, carbon dioxide, spent combustion gases and the like may be used.

Vapors separated in the primary cyclone separator 34, having the bulk of the powdered material removed therefrom, pass through line 44 to a secondary cyclone separator 45 wherein the vapors are subjected to further purification. The secondary cyclone separator 45 may be conveniently built into the upper section of the catalyst hopper 39. Catalyst separated in the secondary cyclone separator 45 may then charge directly into the catalyst hopper 39. Cracked vapors from the secondary cyclone separator 45 are passed through line 46 to a tertiary cyclone separator 47 wherein further removal of powdered material from the cracked products is obtained. The catalyst separated in the tertiary cyclone separator 47 discharges through line 48 having the end thereof terminating in the bottom section of the catalyst hopper 39 at a point below the level of catalyst maintained therein. Cracked vapors are removed from the tertiary cyclone separator 47 through line 49 and passed to a suitable fractionating or rectifying system (not shown) for segregation of the desired motor fuel products from insufficiently cracked constituents and from normally gaseous constituents. The fractionating or rectifying system may be of any conventional design and in the interest of simplicity has not been shown in the drawing.

While we have shown a series of three cyclone separators operating in series for separating the powdered catalyst from the vapors, it will be understood that other equivalent devices for effecting separation of solids from gases may be used if desired.

In cases where the catalyst is not completely removed from the oil vapors prior to passing the same to the fractionating tower, a narrow fraction of the initial condensate formed in the fractionating tower containing the residual catalyst may be segregated from the remainder by means of a trap-out tray or the like and recycled through line 51 to the inlet side of the primary cyclone separator 34.

Catalyst collected in the hopper 39 discharges into a vertical standpipe 52 of sufficient height to feed the catalyst into a stream of regenerating gas under a pressure at least sufficient to overcome the pressure drop through the regenerating circuit.

One of the important phases of the present invention is the provision of a column of catalyst of a height sufficient to produce a bottom pressure which will feed the catalyst into the stream of regenerating gas.

It has been found that under properly controlled conditions the powdered material can be made to flow as a fluid and to conform with many of the physical laws thereof. In order to insure the material flowing as a fluid, it is necessary to prevent the powdered material from packing in the standpipe 52. This can be readily accomplished by the introduction of a small amount of a fluidizing gas at one or more spaced points along the standpipe through lines 55, 56 and 57.

The fluidizing gas introduced through lines 55, 56 or 57 is preferably an inert gas such as steam, carbon dioxide, spent combustion gas, nitrogen or the like.

The lower end of the standpipe 52 is provided with a suitable valve 58 for regulating the amount of catalyst discharging therefrom. A conventional slide valve which can be adjusted to regulate the size of the orifice through which the powder passes is suitable for this purpose, although other types of valves may be used. This valve may be operated manually or automatically, such as by the level in the hopper 39. In the drawing the valve is shown diagrammatically as being controlled through instrument 59 by the level in hopper 39.

As a safety precaution to prevent the possibility of regenerating gas passing upwardly through the standpipe and intermixing with oil vapors, a second safety valve 61 is preferably provided. This valve may be operated automatically to close when the level of powder in the hopper 39 drops below a predetermined point or it may be designed to close automatically when the pressure below the valve 58 approaches or equals the pressure above the valve 58.

The spent catalyst segregated from the cracked products is fed into a stream of regenerating gas which may be air or air diluted with a suitable inert gas, such as steam, carbon dioxide, nitrogen, or the like, introduced into the system through line 65. Regenerating gas is placed under sufficient pressure by means of a blower or other similar device (not shown) for forcing the stream of regenerating gas and catalyst through the regenerating circuit. A suspension of regenerating gas and catalyst to be regenerated is formed in conduit 66 and passed through line 67 to a regenerating chamber 68 (see Fig. 1) which is preferably of a construction similar to the cracking chamber 29.

The regenerating chamber 68 is also preferably of such dimensions that the flow of suspension through the chamber is relatively slow so that considerable slippage occurs between the powder and the gases. The velocity of the gases, however, is greater than the average rate of settling so that the gases may be used to carry the catalyst through the regenerating system. Consequently, as in the cracking chamber 29 the resident time of the catalyst in the regenerating zone is materially greater than the resident time of the regenerating gas therein. The suspension of powdered catalyst and regenerating gas upon being introduced into the regenerating chamber 68 is admixed with cooled regenerated catalyst introduced through conduit 69 as later described. The amount of regenerated catalyst introduced into the regenerating chamber is regulated to control the temperature in the regenerating chamber below a value which would permanently impair the activity of the catalyst. The catalyst, during its passage through the regenerating chamber, is subjected to oxidation reaction to burn off carbonaceous deposits formed thereon during the cracking operation. The suspension of regenerated catalyst and gas, after passing through the regenerating chamber 68, is conducted through line 71 to a primary cyclone separator 72 in which the bulk of the regenerated catalyst is segregated from the regenerating gas.

The density of the stream passing through line 71 may be measured by the pressure drop through a Venturi nozzle 73 located therein and this measurement may be utilized for regulating the flow through the regenerator 68.

It has been found, for example, that the pressure drop across the Venturi nozzle depends upon the density of the stream of gases and solids passing through the nozzle. The use of suitable pressure indicators or recording instruments, which, for simplicity, have not been shown in the drawings, showing the drop in pressure across the Venturi nozzles forms a convenient method for regulating the concentration of the solid contact material in the gas stream.

The regenerated catalyst separated in the primary cyclone separator 72 may discharge directly into a catalyst hopper 74. To this end the cyclone separator 72 may be built into the upper section of the catalyst hopper as illustrated. The regenerating gas is removed from the primary separator 72 through line 75 and is passed to a secondary cyclone separator 76 wherein further removal of the catalyst from the regenerating gas is obtained. Catalyst separated in the secondary cyclone separator 76 discharges through line 77 having the lower end thereof submerged below the level of catalyst maintained in the catalyst hopper 74.

Regenerating gases from the secondary cyclone separator 76 pass through line 78 into a tertiary cyclone separator 79 wherein further removal of regenerated catalyst from the gas is obtained.

Catalyst separated in the tertiary cyclone separator 79 is discharged through line 81 into the catalyst hopper 74 at a point below the level of the catalyst maintained therein. By submerging the ends of the catalyst discharge lines 77 and 81 below the level of the catalyst in the hopper 74, a seal is maintained preventing gas from the catalyst hopper passing in a reverse direction through the secondary and tertiary cyclones.

The regenerating gas from the tertiary cyclone separator 79 is passed through line 82 to heat exchanger 11 wherein it passes in heat exchange relation with fresh oil to be cracked as previously described. The advantage of the heat exchanger 11 is not only to preheat the oil but to cool the regenerating gases to a point where they may be passed to an electrical precipitator for complete removal of the powdered material. For example, the regenerating gas during passage through heat exchanger 11 may be cooled from a temperature of 1000° down to 700° before passing to the electrical precipitator.

Regenerating gas, after passing through the heat exchanger 11, is transferred through line 83 to an electrical precipitator 84 for further purification of the gas prior to releasing the same to the atmosphere. This electrical precipitator may be of any conventional construction. Catalyst precipitated in the electrical precipitator 84 discharges through line 85 into the catalyst hopper 74 at a point below the level of the material therein. The regenerating gas, after having been substantially purified by means of the cyclone separators and electrical precipitators, is rejected from the system through line 86. This gas may, if desired, be passed to a suitable waste heat boiler or other heat recovery system for removal of heat before being released to the atmosphere.

The regenerated catalyst collected in the hopper 74 discharges continuously into a pair of standpipes 87 and 88. The standpipe 88 should have a height sufficient to produce a pressure at the bottom thereof sufficient to feed the catalyst into the stream of oil vapors to be cracked which in turn must be at least sufficient to overcome the pressure drop through the cracking equipment.

The standpipe 87 should also be of a height sufficient to develop a pressure at the bottom adequate to return the catalyst to the regenerating zone.

In order for the standpipes to be effective for developing pressure, it is important that the catalyst maintained therein be in a freely flowing state therein. To this end, a fluidizing gas may be introduced at one or more spaced points in standpipes 87 and 88 through lines 90 to 93, inclusive, and 94 to 96, inclusive, respectively.

The catalyst maintained in the standpipe 88 is adapted to be returned to the cracking circuit. To this end the bottom of the standpipe 88 may be provided with valve 97 for regulating the flow of catalyst into the stream of oil vapors in conduit 27.

The valve 97 may be regulated to maintain the desired catalyst concentration in the oil stream as measured by pressure drop across the Venturi nozzle 33 as heretofore described with respect to the Venturi nozzle 73 in the regenerating gas stream line 71.

Also, as shown, a second or safety valve 99 may be placed at the bottom of the standpipe 88 to prevent the possibility of oil vapors from line 27 passing through standpipe 88 and intermingling with regenerating gas. To this end the valve 99 may be made to close automatically when the level in standpipe 88 or hopper 74 drops below a predetermined point or when the difference in pressure between opposite sides of the valve 97 reaches a specified minimum.

Catalyst collected in the standpipe 87 is adapted to be returned to the regenerating chamber for regulating the temperature therein.

To this end, a portion of the catalyst collected in the standpipe 87 may be passed through valve 103 and line 104 to the cooler 13 where it passes in heat exchange with fresh oil to be distilled and cracked and thence back to regenerating zone 68. If desired, a portion of the catalyst returned to the regenerating zone may by-pass the cooler 13 through valve 105 and line 106. If desired, air or other regenerating gas may be introduced through line 107 into the stream of regenerated catalyst being circulated through cooler 13 or through line 108 into the line 106 by-passing the cooler or both to serve as a carrier for the catalyst being returned.

By regulating the relative amounts of cooled regenerated catalyst and uncooled regenerated catalyst returned to the regenerating chamber through lines 104 and 106, respectively, a careful control of temperature within the regenerating chamber may be obtained.

In many cases the amount of heat which must be removed from the catalyst during regeneration is in excess of that required to preheat the oil feed to the desired temperature. Furthermore, it is desirable from a practical standpoint to feed the oil to the vaporizing coil 16 at a uniform temperature regardless of the amount of heat liberated in the regenerating zone.

As shown in the drawing, a part of the oil, after passing through the heat exchanger 13, may be passed through line 111 to a waste heat boiler 112 wherein the oil may be cooled and steam generated. The oil, after passing through the waste heat boiler 112, may be returned to the inlet side of the heat exchanger 13 by means of pump 113 and line 114.

By regulating the amount of oil passing through the waste heat boiler 112 a uniform temperature of feed passing to the vaporizing coil 16 may be maintained without affecting the amount of cooling carried out in the catalyst cooler 13.

From the above description it will be apparent that all of the pressure necessary for introducing the catalyst into the stream of reaction gases and regenerating gases is obtained from vertical columns of catalyst rather than by the use of mechanical devices.

For better understanding of the invention, the following examples may be of help, it being understood that the values and conditions given therein are illustrative rather than limitive.

Reduced crude to be treated introduced into the system through line 10 may be preheated in the heat exchanger 11 from an initial temperature of 400° to 450° F. to a temperature of from 450° to 500° F. and in the catalyst cooler 13 to a temperature of from 650° to 750° F., usually 700° F., prior to passing to the vaporizer 16. The oil during its passage through the vaporizing coil 16 is heated to a temperature of from 800° to 900° F., usually 850° F. The oil then passes from vaporizer coil 16 to the separator where from 60 to 95% passes overhead as vapors. The vapors from the separator pass through a superheater where they are further heated to a temperature of from 850° to 950° F., preferably 900° F.

The amount of pressure imposed upon the oil vapors should be sufficient to overcome the resistance through the cracking circuit and the fractionating system. In cracking apparatus of commercial size employing the type of reactor previously described, a pressure of an atmosphere gauge is ordinarily sufficient.

The catalyst introduced into the stream of oil vapors may be any active cracking catalyst, such as naturally active or activated clays and particularly acid treated clays, or it may be synthetic gels or other adsorptive catalysts of the same or different chemical composition, such as synthetic silica-alumina gels, silica-magnesia gels, and mixtures thereof.

The amount of catalyst introduced into the oil vapors may range from 0.1 to 20 parts of catalyst per part of oil by weight. When employing acid treated bentonitic clays, the ratio may be 4 parts catalyst per part of oil. The temperature of the catalyst introduced into the oil stream is preferably substantially the final regenerating temperature which may be in the order of 1,000° to 1,100° F. so that the resulting equilibrium temperature of the catalyst and oil vapors may be between 900° F. and 1,000° F.

The height of the standpipe 88 from which the catalyst is fed into the oil stream should be sufficient to develop a head of pressure adequate to feed the catalyst into the stream of oil vapors.

In a specific instance where activated clay is employed as a catalyst and when the column is properly fluidized by addition of fluidizing gas along the standpipe, from 4 to 6 feet of fluidized catalyst are required for each pound of pressure. In the specific case wherein the oil vapors are under a pressure of one atmosphere gauge and where the pressure at the top of the standpipe 88 is of the order of 3 pounds per square inch, the minimum height of the standpipe will be of the order of 50 feet and is preferably 100 feet or more. In order to insure proper control of the catalyst feed into the oil stream, it is necessary to maintain a pressure differential across the control valve 97 of from 2 to 5 pounds per square inch.

The velocity of the oil stream passing through the cracking zone 29 is preferably below 8 feet per second and may, for example, be of the order of about 2 feet per second. When these low velocities are maintained, the concentration of catalyst within the reaction zone is materially greater than the concentration of catalyst in the stream passing to the reaction zone. For example, when the velocity of oil vapors of 2 feet per second is employed, the concentration of catalyst within the cracking zone may build up to 10 pounds per cubic foot of reaction space. Under such circumstances the resident time the catalyst is retained in the reaction zone may be about 3 minutes, whereas the resident time of the oil vapors will be in the order of 10 seconds.

The cracked vapors and spent catalyst pass to the primary cyclone separator at a temperature of from 850° to 950° F. The pressure drop from the point where the catalyst is introduced into the oil vapors through the cracking chamber up to the primary cyclone where the catalyst is separated may be of the order of 5 pounds per square inch. In such case the oil vapors passing to the fractionating tower will be under a positive pressure of about 10 pounds per square inch. As a result, no additional pressure need be imposed to accomplish the subsequent fractionation and stabilizing treatment.

The height of the standpipe 52 which feeds the catalyst into the regenerating gas should be sufficient to produce a head of pressure at the bottom which will feed the spent catalyst into a stream of regenerating gas which in turn must be under sufficient pressure to carry the mixture through the regenerating circuit. This pressure may, for example, be of the order of 12 to 15 pounds per square inch gauge. In such case, when the back pressure on the hopper 39 is of the order of 10 pounds per square inch gauge, the height of the standpipe 52 may be of the order of from 30 to 60 feet to insure a proper differential across the control valves.

The catalyst and regenerating gas passing to the regenerating chamber 68 are commingled with cooled regenerated catalyst recycled through standpipe 87 and cooler 13 in such proportions that the equilibrium temperature of the mixture introduced into the regenerator is of the order of 900° F. The temperature, however, will be controlled by the amount of catalyst being recirculated through the cooler and the amount being recirculated but by-passing the cooler to prevent the temperature within the regenerator from exceeding a point which would permanently impair the activity of the catalyst. In the case of activated clays previously mentioned, the maximum permissible temperature in the regenerating zone may be of the order of 1050° F.

The velocity of regenerating gas passing through the regenerating zone may be substantially the same as that of the oil vapors passing through the cracking zone, such as from 1 to 8 feet per second. Under such conditions the resident time of catalyst in the regenerating zone may be from one minute to 5 minutes and the resident time of the regenerating gas in the regenerating zone may be from 2 to 60 seconds.

The suspension of regenerated catalyst and regenerating gas is separated in the cyclone separators and electrical precipitators at a temperature approximating the temperature obtained during regeneration, which may be of the order of 1000° to 1100° F. as previously described.

The height of the standpipe 87 for returning catalyst through cooler 13 and back into the stream of unregenerated catalyst passing to the regenerator should be sufficient to overcome the pressure drop through the cooler, regenerating chamber and connecting conduits.

It may be helpful to mention at this point that the circulation of the powder from the point of highest elevation back to the same point is made possible by the fact that the density of the upflowing stream is lower than that in the downflowing stream. The pressure developed in the standpipes and superimposed hoppers may be expressed by the formula $DP=dh$, where DP is the differential pressure, $d$ is the density of the material and $h$ the distance from top to bottom.

In order for the powder to circulate in the system, $d_1h_1$ must be greater than $d_2h_2$, where $d_1h_1$ is the density and height of material in the downflowing stream in the standpipes and $d_2h_2$ the density and height of material in the upflowing stream passing through the reactor or regenerator and connecting pipes. The density of the upflowing stream is maintained below the density of the material in the standpipes by introducing the reaction or regenerating gas into the upflowing stream. The same result might also be accomplished by application of heat on the upflowing stream.

In order for the powdered material to seek its own level and otherwise behave as a liquid, the solid must be in finely-divided form and each particle should preferably be surrounded by a film of gas. Particle sizes smaller than 200 mesh are usually preferred.

While the invention has been described as applied to the catalytic cracking of hydrocarbon oils, in which process it finds particular application, the same general procedural steps apply to other types of hydrocarbon reactions with or without the presence of extraneous gas, such as hydrogen, although the specific operating conditions will usually vary from that just described.

For example, in the reforming of gasoline to improve octane number, the catalyst may be a carrier, such as alumina or magnesia, preferably in adsorptive form containing oxides or sulfides of the metals of group III to VIII, preferably the metals of group VI. The temperature may range from 900° to 1400° F. and the contact time from 2 to 60 seconds. The pressures employed may range from atmospheric to 400 pounds per square inch.

With respect to pressure, it will be understood that the system may be operated under any desired pressure since the standpipes are employed to produce enough pressure to overcome the pressure drop in the system.

In case hydrogen is employed in reforming, some provision is necessary for recycling excess hydrogen.

When the process is utilized for dehydrogenating gases, the same general type of catalyst as employed in reforming may be used. The temperature may be somewhat higher, such as from 700° to 1400° F. and the pressure may be somewhat lower and may range from subatmospheric to 200 pounds per square inch.

In the alkylation of olefins with branched chain paraffins, active alkylating catalysts may be employed. One particularly suitable catalyst is a complex sodium-aluminum chloride. The pressure may be of the order of 500 to 3000 pounds per square inch.

In hydrocarbon processes involving isomerization of straight chain to branched chain paraffins, sodium aluminum chloride may be used as a catalyst or anhydrous aluminum chloride or boron fluoride adsorbed on adsorptive carriers, such as activated charcoal, natural or activated clays, synthetic gels, or the like. The temperature may be of the order of 200° to 300° F. and the pressure from atmospheric to 300 pounds per square inch.

For isomerizing olefins, activated clays, bauxite, and activated aluminas may be employed as catalysts and the temperature may be from 575° to 1000° F.

In catalytic refining of hydrocarbons to remove gum-forming constituents, sulfur and other impurities, activated alumina, alumina gels, naturally active or activated clays with or without the presence of other metal oxides may be used as a catalyst. In such processes, the temperature is below active cracking temperature, such as from 400° to 800° F.

For reactions involving hydrogenation, pressures upwards of 300 pounds per square inch should be employed. Temperatures upwards of 700° F. may be employed with a catalyst consisting of finely-divided nickel, tungsten, molybdenum, or the oxides and sulfides thereof. Also other known hydrogenating catalysts may be employed.

For example, in some variations of the catalytic cracking process or in some other processes using the above invention, the amount of heat liberated in regeneration may be relatively small and the range of desirable regenerating temperature from inlet to outlet may be relatively large so that it is feasible to cool the stream of fluidized spent catalyst prior to its induction into the regenerator and omit the recycling of regenerated catalyst from the standpipe containing regenerated catalyst to the regenerator.

In some cases it may even be desirable to heat the regenerated catalyst recycled to the reactor rather than to cool.

Also, in some processes using the above invention, the amount of heat absorbed in the treating step may be relatively large and the range of desirable operating temperature from inlet to outlet may be relatively small so that it is desirable to add to the apparatus above described equipment, not shown, to permit recycling catalyst from the spent catalyst standpipe through indirect heat exchange equipment or other means (to put heat into the stream) back into the reactor.

While we have shown the step of stripping the catalyst recovered in the primary cyclone 34, in many cases this step may be omitted.

For lack of a better name, the term "fluistatic" as employed in the claims is intended to be synonymous with "hydrostatic," except that it is not limited to liquids but applies also to finely-divided solids which in fluidized state behave in many respects as a liquid.

Having described the preferred embodiment of the invention, it is understood that it embraces such other variations and modifications as come within the spirit and scope thereof.

What is desired to be protected by Letters Patent is:

1. A continuous process for the conversion of hydrocarbon oils which comprises forming a suspension of oil vapors to be converted and finely divided conversion catalyst, passing the resulting suspension while at conversion temperature upwardly through a conversion zone to thereby effect sedimentation of said catalyst particles by the influence of gravity and increase the length of time of contact of the catalyst particles with said oil vapors, thereafter separating the catalyst particles from the conversion products, passing the catalyst so separated through a regeneration zone containing an oxidizing gas to burn carbonaceous deposits contained on the catalyst so separated, separating the regenerated catalyst from said last-named gas while at a pressure below the pressure of the oil vapors passing to said conversion zone, maintaining a vertical column of finely divided regenerated catalyst, the pressure on the catalyst particles at the top of said column being less than the pressure on the oil vapors at the point of formation of said suspension and the pressure at the base of said column being greater than the pressure on the oil vapors at the point of formation of said suspension, introducing an inert gas into said column to facilitate the flow of regenerated catalyst therethrough, transferring catalyst separated from said regenerating gas to the top of said column and transferring catalyst from the base of said column into said oil vapors to be converted to thereby form said suspension therewith.

2. In a process for the conversion of hydrocarbon oil the steps which comprise introducing a confined stream of said oil at elevated pressure into the bottom portion of an enlarged conversion zone containing a body of finely divided conversion catalyst, passing the oil in vapor form upwardly through the conversion zone at a reduced velocity controlled to maintain a relatively dense phase of said catalyst and oil vapor within said zone, maintaining a column of said catalyst exterior to said conversion zone, passing a gaseous medium lengthwise of said column in an amount controlled to fluidize the catalyst substantially throughout the entire length thereof and cause such catalyst to exert a fluistatic pressure at the base of said column, maintaining said column at a height sufficient to generate a fluistatic pressure at the bottom thereof greater than the pressure on said oil, discharging a stream of said fluidized catalyst from the base of said column while under said fluistatic pressure into said oil prior to passing the same through said conversion zone and withdrawing catalyst from said conversion zone.

3. In a process for the catalytic conversion of hydrocarbon oils the steps which comprise introducing a confined stream of said oil at elevated pressure into the bottom portion of an enlarged conversion zone containing a body of finely divided conversion catalyst, passing the oil in vapor form upwardly through the conversion zone at a reduced velocity controlled to maintain a relatively dense phase of catalyst and oil vapors within said conversion zone, maintaining a column of said catalyst exterior to said conversion zone, introducing a fluidizing gas into said column at spaced points therealong in an amount controlled to fluidize the catalyst throughout substantially the entire length thereof and cause said catalyst to exert a fluistatic pressure at the base of said column, maintaining said column at a height sufficient to generate a fluistatic pressure at the bottom thereof greater than the pressure on said oil, delivering a stream of said fluidized conversion catalyst from the base of said column while under said fluistatic pressure into said oil prior to passing the same through said conversion zone and continuously withdrawing catalyst from said conversion zone.

4. In a process for the conversion of hydrocarbons the steps which comprise passing a confined stream of said hydrocarbons in vapor form and at elevated pressure upwardly through an enlarged conversion zone containing a body of finely divided conversion catalyst at a low velocity controlled to maintain a relatively dense turbulent phase of catalyst and vapors in said zone, withdrawing conversion catalyst from said conversion zone, maintaining a column of said catalyst so withdrawn, passing a stream of said catalyst into the top of said column, said column containing a gas in amount controlled to fluidize said catalyst and to generate a fluistatic pressure at the base of said column, passing a stream of oxidizing gas at elevated pressure upwardly through a regenerating zone containing a body of finely divided conversion catalyst withdrawn from said conversion zone at a reduced velocity controlled to maintain said body within said regeneration zone in a turbulent fluidized state, delivering catalyst from the base of said column into said regenerating zone, maintaining a second column of regenerated catalyst, passing a stream of catalyst from said regenerating zone to the top of said last named column, said last named column containing a gaseous medium in amount controlled to fluidize the catalyst therein and thereby generate a fluistatic pressure at the base of said last named column, delivering regenerated catalyst from the base of said column into said conversion zone and maintaining the combined height of said columns sufficient to generate a total fluistatic pressure greater than the total loss in pressure on said hydrocarbons and regenerating gas passing through the conversion and regenerating zones respectively.

5. In a process for the conversion of hydrocarbons the steps which comprise passing a confined stream of said hydrocarbons in vaporous form and at elevated pressure upwardly through an enlarged conversion zone containing a body of finely divided conversion catalyst at a reduced velocity controlled to maintain said body in a turbulent fluidized state, separating conversion catalyst containing entrained hydrocarbon vapors and combustible deposits from the remainder of said vapors, passing a stripping gas in contact with the catalyst so separated to strip entrained vapors therefrom, maintaining a column of conversion catalyst so stripped, discharging the stripped catalyst into the top of said column, introducing a fluidizing gas into the lower portion of said column in an amount controlled to fluidize said catalyst and thereby generate a fluistatic pressure at the base of said column, discharging the fluidized conversion catalyst from the base of said column into a regenerating zone maintained at elevated pressure, subjecting the catalyst to oxidizing treatment within the regenerating zone to remove combustible deposits therefrom, returning the regenerated catalyst to the conversion zone and maintaining said column at a height sufficient to generate a fluistatic pressure at the base thereof greater than the pressure in said regenerating zone.

6. In a process for cracking hydrocarbon oils in the presence of a finely divided cracking catalyst the steps which comprise passing a confined stream of said oil in vapor form and at elevated pressure upwardly through an enlarged cracking zone containing a body of said cracking catalyst at a reduced volocity controlled to maintain said body of catalyst in a dense fluidized state, maintaining exterior to said cracking zone a separate column of said finely divided catalyst containing a gaseous medium in amount controlled to fluidize the catalyst therein and generate a fluistatic pressure at the base of said column, maintaining said column at a height sufficient to generate a fluistatic pressure greater than the pressure on said oil, delivering a stream of the fluidized catalyst from the base of said column while under fluistatic pressure into said stream of hydrocarbon oil prior to passing the same through said cracking zone, withdrawing finely divided cracking catalyst from the cracking zone, regenerating the withdrawn catalyst to remove combustible deposits therefrom and passing the regenerated catalyst to the top of said column for return to said cracking zone.

7. In a process for cracking hydrocarbon oil in the presence of finely divided cracking catalyst the steps which comprise passing a confined stream of said oil in vapor form and at elevated pressure upwardly through an enlarged cracking zone containing a body of said finely divided cracking catalyst at a low velocity controlled to maintain said body in a dense fluidized state, withdrawing catalyst from said cracking zone, maintaining a column of said withdrawn catalyst, delivering a stream of said withdrawn catalyst to the top of said column, maintaining a gaseous medium in admixture with said catalyst within the said column in an amount controlled to fluidize said catalyst throughout the full length thereof and generate a fluistatic pressure at the base of said column, delivering catalyst from the base of said column into a regenerating zone maintained at elevated pressure wherein combustible deposits formed on said catalyst during the cracking treatment are removed therefrom, returning the regenerated catalyst to the conversion zone, and maintaining said column at a height sufficient to generate a pressure at the base thereof greater than the pressure in said regenerating zone.

8. In a process for cracking hydrocarbon oils in the presence of finely divided catalyst the steps which comprise passing a confined stream of said oil in vapor form upwardly through an enlarged cracking zone maintained at elevated pressure, containing a body of finely divided cracking catalyst at a low velocity controlled to maintain said body in a turbulent fluidized state, separating cracking catalyst containing combustible deposits and entrained hydrocarbon vapors from the remainder of said vapors, contacting the withdrawn catalyst with a stripping gas to strip entrained hydrocarbon vapors therefrom, discharging the stripped catalyst into the top of a vertical column of catalyst, maintaining a gaseous medium in admixture with said catalyst within said column in an amount controlled to fluidize said catalyst and generate a fluistatic pressure at the base of said column greater than the pressure in the regenerating zone hereinafter mentioned, delivering a stream of catalyst from the base of said column into a regenerating zone, passing an oxidizing gas upwardly through said regenerating zone at a low velocity controlled to maintain the catalyst therein in a turbulent fluidize state, withdrawing regenerated catalyst from the regenerating zone, passing a stream of catalyst so withdrawn to the top of a second column of catalyst, delivering catalyst from the base of said last named column to said cracking zone, maintaining a gaseous medium in admixture with said catalyst in said last named column in an amount controlled to fluidize said catalyst and generate a fluistatic pressure at the base thereof sufficient to deliver said catalyst into said cracking zone.

9. In a process for the cracking of hydrocarbon oils in the presence of finely divided catalyst the steps which comprise passing the oil in vapor form upwardly under elevated pressure through an enlarged cracking zone, containing a body of said finely divided catalyst, at a low velocity controlled to maintain said body in a turbulent fluidized state, maintaining a column of finely divided catalyst exterior to said cracking zone, passing a gaseous medium lengthwise of said column in an amount controlled to fluidize the catalyst therein and generate a fluistatic pressure at the base of said column greater than the pressure in said cracking zone, delivering catalyst from the base of said column into said cracking zone, removing cracking catalyst from said cracking zone, passing the catalyst so removed to a regenerating zone, passing an oxidizing gas upwardly through said regenerating zone at a low velocity controlled to maintain a turbulent fluidized body of catalyst within said regenerating zone, removing regenerated catalyst from the regenerating zone and passing the regenerated catalyst so removed to the top of said column for return to said cracking zone.

10. In a process for cracking hydrocarbon oils in the presence of finely divided catalyst the steps which comprise passing a confined stream of said oil in vapor form upwardly through an enlarged cracking zone containing a body of said finely divided catalyst at a low velocity controlled to maintain said body in a dense fluidized state, withdrawing catalyst from said cracking zone, treating the catalyst so withdrawn to remove entrained hydrocarbon vapors therefrom, thereafter passing the withdrawn catalyst into the top of a column of said catalyst, maintaining a gaseous medium in admixture with said catalyst within said column in an amount controlled to fluidize the catalyst therein and thereby generate a fluistatic pressure at the base of said column sufficient to deliver said catalyst to a regenerating zone, delivering catalyst from the base of said column into said regenerating zone, passing a regenerating gas upwardly through said regenerating zone at a low velocity controlled to maintain a turbulent fluidized body of catalyst undergoing regeneration within said regenerating zone, withdrawing regenerated catalyst from the regenerating zone and returning the regenerated catalyst to said conversion zone.

11. In a process for cracking oils in the presence of finely divided catalyst the steps which comprise forming a suspension of oil vapors and catalyst in a region of elevated pressure, passing the resulting suspension upwardly at low velocity in a cracking zone to thereby effect sedimentation of said catalyst by the influence of gravity and increase the time of residence of the catalyst in the cracking zone, maintaining a column of said catalyst passing a gaseous medium lengthwise of said column in amount controlled to maintain the catalyst in a freely flowing fluidized state throughout substantially the entire length thereof, the column being of such height that the fluistatic pressure developed thereby is sufficient for introduction of the catalyst to said suspension-forming region and delivering catalyst from the bottom of said column to said region.

12. In a process for cracking hydrocarbon oil in the presence of finely divided catalyst the steps which comprise forming a suspension of said oil in vapor form and catalyst in a region of elevated pressure passing the resulting suspension into a cracking zone, passing the oil vapors upwardly through said zone at a low velocity to effect substantial sedimentation of the catalyst by the influence of gravity within said cracking zone, separating catalyst containing combustible deposits from the oil vapors, maintaining a column of said withdrawn catalyst in freely flowing fluidized state exterior to said cracking zone, maintaining said column at a height sufficient to generate a fluistatic pressure greater than the pressure on the regenerating gas hereinafter mentioned, discharging the catalyst from the base of said column into a stream of regenerating gas under elevated pressure, passing the suspension of regenerating gas and catalyst into a regenerating zone, removing regenerated catalyst from said regenerating zone, passing the regenerated catalyst to the top of a second column of catalyst, discharging the regenerated catalyst from the base of said last named column into the oil to be cracked, maintaining a gaseous medium in admixture with the catalyst in the last named column in an amount controlled to fluidize the catalyst and generate a fluistatic pressure at the base of said last named column, the height of said last named column being sufficient to generate a pressure greater than the pressure of the oil vapors in the suspension-forming region.

13. In a process for contacting solids with gases the steps which comprise passing a confined stream of a gaseous medium upwardly through a contacting zone containing a body of finely divided solids at a low velocity controlled to maintain a relatively dense fluidized phase of gas and solids in said zone, maintaining a column of said finely divided solids exterior to said contacting zone, passing a gaseous medium lengthwise of said column in an amount controlled to fluidize the solids throughout the full length thereof and thereby generate a fluistatic pressure at the base of said column, delivering a stream of fluidized solids from the base of said column while under said fluistatic pressure into the first named stream prior to passing the same through the contacting zone and continuously withdrawing finely divided solids from the contacting zone, the height of said column being sufficient to generate a fluistatic pressure substantially greater than the loss in pressure of the gases passing through the contacting zone.

14. In a process for contacting gases with finely divided solids the steps which comprise passing a confined stream of said gas under elevated pressure into the bottom portion of an enlarged contacting zone containing a body of said finely divided solids, passing the gas upwardly through said contacting zone at a reduced velocity controlled to maintain the body therein in a turbulent fluidized state, maintaining a column of said solids exterior to said contacting zone, passing a gaseous medium lengthwise of said column in an amount controlled to fluidize such solids and maintain a more dense body of solids in said column than is maintained in said contacting zone, the height of said column being sufficient to generate a fluistatic pressure at the base thereof substantially greater than the pressure of the gases passing to said contacting zone, delivering solids from the base of said column into said stream of gas prior to passing the same through the contacting zone and withdrawing solids from said contacting zone.

15. In a process for contacting finely divided solids with gas the steps which comprise passing a confined stream of said gas into the bottom of an enlarged contacting zone containing a body of said finely divided solids, passing the gases upwardly through said contacting zone at a reduced velocity controlled to maintain a relatively dense fluidized body of solids within said zone, maintaining a column of said finely divided solids exterior to said contacting zone, introducing a gaseous medium into said column at spaced points therealong in an amount controlled to fluidize the solids through substantially the entire length thereof and generate a fluistatic pressure at the base of said column, maintaining said column at such height that the fluistatic pressure generated thereby is substantially greater than the pressure of the gases passing to said contacting zone, delivering solids under fluistatic pressure from the base of said column into said first named stream of gas prior to passing the same through the contacting zone and withdrawing solids from the contacting zone.

16. In a process for contacting finely divided solids with a gas the steps which comprise passing a stream of said gas at elevated pressure into the bottom of an enlarged vertical contacting zone containing a body of said finely divided solids, passing the gas upwardly through the zone at a reduced velocity controlled to maintain a dense fluidized phase of solids and gas therein, maintaining a column of said solids exterior to said contacting zone, introducing a gaseous medium into the lower portion of said column, passing gases through substantially the entire length of said column in an amount controlled to fluidize the solids therein and generate a fluistatic pressure at the base of the column, maintaining said column of such height that the pressure generated thereby is substantially greater than the pressure on the gas passing to said contacting zone, releasing a portion of the pressure on said solids while retaining sufficient pressure on such solids to deliver such solids into said first-named stream of gas, and thereafter delivering the solids under the reduced pressure into the stream of gas passing to the contacting zone.

17. A process for contacting gas and a finely divided solid which includes forming a suspension of said gas and solid in a region of elevated pressure, passing the resulting suspension at a low velocity upwardly in a treating zone to thereby effect substantial sedimentation of said solid by the influence of gravity, maintaining a column of said solid, passing a gas lengthwise of said column in an amount controlled to keep the solid in a freely flowing fluidized state throughout the length thereof, the column being of such height that the fluistatic pressure developed thereby is sufficient for introduction of the solid to said suspension-forming region, and delivering the solid from the bottom of said column to said region.

18. A process for contacting gas and a finely divided solid which includes forming a suspension of said gas and solid in a region of elevated pressure, passing the resulting suspension at a low velocity upwardly in a treating zone to thereby effect a substantial sedimentation of said solid by the influence of gravity, maintaining a column of said solid, introducing a gaseous medium into the lower portion of said column and passing it lengthwise of said column in an amount limited to maintain said solids in freely flowing fluidized state throughout the full length thereof, maintaining said column at such height that the fluistatic pressure developed thereby is substantially greater than the pressure in the suspension-forming region, releasing a portion of the pressure generated at the base of said column, while retaining sufficient pressure on said solid to deliver the same into said first named region of elevated pressure, delivering solids from the base of said column under reduced pressure into said region and controlling the amount of pressure release to regulate the amount of solids delivered to said region.

19. In a system for the conversion of hydrocarbons, the combination of apparatus elements which comprises an enlarged vertical conversion chamber adapted to contain a body of finely divided conversion catalyst, means for passing a stream of hydrocarbons in vapor form upwardly through said conversion chamber at a low velocity controlled to maintain a relatively dense phase of solids and vapors within said conversion chamber, means for withdrawing converted vapors from the top of said conversion chamber, an enlarged vertical regeneration chamber, means for transferring catalyst from said conversion chamber to said regeneration chamber, means for passing a regenerating gas upwardly through the regenerating chamber at a velocity controlled to maintain a relatively dense phase of catalyst and regenerating gas in said regenerating chamber, means for transferring regenerated catalyst from said regenerating chamber to said conversion chamber, said last named means comprising a standpipe adapted to contain a column of said regenerated catalyst, means for introducing an aerating gas into said standpipe at spaced points therealong in an amount sufficient to maintain said catalyst in a fluidized condition capable of generating a fluistatic pressure at the base thereof, the height of said standpipe being sufficient to contain a column of catalyst capable of generating a pressure of fluidized catalyst at the base of said standpipe greater than the pressure within said conversion chamber, means for transferring regenerated catalyst from the base of said standpipe to said conversion chamber and means at the base of said standpipe for controlling the flow of regenerated catalyst to said conversion chamber.

20. In a system for the conversion of hydrocarbon oils the combination of apparatus elements comprising an enlarged vertical conversion chamber adapted to contain a body of finely divided conversion catalyst, means for passing a stream of oil vapor under elevated pressure upwardly through said conversion chamber at a low velocity controlled to maintain a relatively dense phase of solid catalyst and oil vapors in said conversion chamber, means for withdrawing converted vapors from the upper portion of said conversion chamber, an enlarged vertical regenerating chamber, means for transferring catalyst from said conversion chamber to said regenerating chamber, said last named means comprising a standpipe communicating at its upper end with said conversion chamber and its lower end with said regenerating chamber, said standpipe being adapted to contain a column of catalyst withdrawn from said conversion chamber, means for introducing a fluidizing gas into the catalyst in said column in amount controlled to generate a fluistatic pressure at the base of said standpipe greater than the pressure maintained in the regenerating zone, means for passing the regenerating gas upwardly through the regenerating chamber at a low velocity controlled to maintain a relatively dense phase of catalyst and regeneration gas therein, means for transferring regenerated catalyst from said regenerating chamber to said conversion chamber, said last named means comprising a standpipe adapted to contain a column of regenerated catalyst, means for introducing a gas into the catalyst in said column in amount adjusted to fluidize the catalyst and generate a fluistatic pressure at the base of said column, means for transferring catalyst from the base of said column to said conversion chamber and means at the base of said standpipes for controlling the rates of flow of the catalyst between said conversion chamber and said regenerating chamber.

21. In a system adapted for the conversion of hydrocarbons wherein finely divided conversion catalyst is circulated in a closed circuit in series through a conversion chamber and a regenerating chamber; the improved combination which comprises a vertically elongated conversion chamber having an inlet for hydrocarbons in the bottom portion thereof and an outlet for converted products in the top portion thereof, a vertically elongated regeneration chamber having an inlet for regeneration gas in the lower portion thereof and an outlet for regeneration gas at the top thereof, conduit means connecting said conversion chamber with said regeneration chamber for transferring a stream of catalyst from said conversion chamber to said regenerating chamber, separate conduit means connecting said regeneration chamber with said conversion chamber for returning regenerated catalyst from said regeneration chamber to said conversion chamber, one of said conduit means including an upwardly extending section having a height sufficient to contain a column of aerated catalyst capable of restoring a material portion of the pressure lost during circulation of the catalyst through the remaining portions of the equipment through which the catalyst circulates, a plurality of pipes of smaller diameter than said conduits connected to said vertical section at spaced points therealong for introducing gas into said vertical section, means for controlling the amount of gas introduced at each of said points and means for controlling the flow of solids through both of said conduit means.

22. In the process of converting hydrocarbons wherein the vapors of said hydrocarbons are contacted at conversion temperatures with finely divided solid catalysts in suspension in an upflow stream of hydrocarbon vapors in a reaction zone wherein the velocity of said vapors is sufficiently low to permit settling of said catalyst, resulting in increased concentration of catalyst within said reaction zone while said catalyst is continuously discharged from the top of said reaction zone with said hydrocarbon vapors, the improvement comprising maintaining a low superatmospheric pressure in said reaction zone, feeding fresh, dry, free-flowing aerated powder catalyst to said reaction zone from the base of a column of catalyst of sufficient height to provide the pressure required for feeding the catalyst into said reaction zone, and injecting aerating gas into said column to maintain the catalyst in free-flowing condition therein.

23. In a process wherein hydrocarbons are converted in the presence of finely divided conversion catalyst which circulates through a conversion zone in which it contacts the hydrocarbons and through a regenerating zone in which it contacts a regeneration gas; the combination of steps which comprises passing the regenerating gas upwardly through the regenerating zone at a low velocity controlled to maintain a dense turbulent body of catalyst therein, maintaining a column of said catalyst exterior to said zones, introducing gas into said column in amount controlled to maintain the catalyst in a fluid state throughout the full length thereof and thereby generate a fluistatic pressure at the base of said column, transferring catalyst from the cracking zone to the top of said column while under a pressure lower than the pressure in the regeneration zone and delivering catalyst from the bottom of said column to the regenerating zone, said column being of a height which will develop a pressure sufficient to deliver the catalyst to said regenerating zone.

DONALD L. CAMPBELL.
HOMER Z. MARTIN.
EGER V. MURPHREE.
CHARLES W. TYSON.

REFERENCES CITED

The following references are of record in the file of this patent:

UNITED STATES PATENTS

| Number | Name | Date |
|---|---|---|
| 1,845,058 | Pier | Feb. 16, 1932 |
| 1,984,380 | Odell | Dec. 18, 1934 |
| 2,199,838 | Tyson | May 7, 1940 |
| 2,231,231 | Subkow | Feb. 11, 1941 |
| 2,231,424 | Huppke | Feb. 11, 1941 |
| 2,253,486 | Belchetz | Aug. 19, 1941 |
| 2,273,075 | Weems | Feb. 17, 1942 |
| 2,289,329 | Prickett | July 7, 1942 |
| 2,304,827 | Jewell | Dec. 15, 1942 |
| 2,305,569 | Degnen | Dec. 15, 1942 |
| 2,311,564 | Munday | Feb. 16, 1943 |
| 2,349,574 | Conn | May 23, 1944 |

FOREIGN PATENTS

| Number | Country | Date |
|---|---|---|
| 441,619 | Germany | Mar. 11, 1927 |
| 533,037 | Germany | Sept. 8, 1931 |